(12) United States Patent
Crouch

(10) Patent No.: US 8,708,166 B1
(45) Date of Patent: Apr. 29, 2014

(54) CONFECTION RACK

(71) Applicant: Elizabeth Lynne Crouch, Sheridan, OR (US)

(72) Inventor: Elizabeth Lynne Crouch, Sheridan, OR (US)

( * ) Notice: Subject to any disclaimer, the term of this patent is extended or adjusted under 35 U.S.C. 154(b) by 0 days.

(21) Appl. No.: 13/785,743

(22) Filed: Mar. 5, 2013

Related U.S. Application Data

(60) Provisional application No. 61/731,237, filed on Nov. 29, 2012.

(51) Int. Cl.
  *A47F 7/00* (2006.01)
  *A47F 5/14* (2006.01)
  *A45D 19/04* (2006.01)
  *A01G 5/00* (2006.01)
  *A47G 7/00* (2006.01)
  *A01G 13/00* (2006.01)

(52) U.S. Cl.
  USPC ....... 211/85.4; 211/181.1; 220/743; 248/175; 47/41.13; 47/31

(58) Field of Classification Search
  USPC ............. 211/85.4, 14, 133.5, 126.8, 85.31, 211/181.1; 248/27.8, 153, 175; 47/44, 45, 47/47, 20.1, 31, 54, 51, 41.11, 41.13, 47/41.01, 66.5, 66.6; 220/743, 23.2, 495, 220/494, 484, 737, 23.4
  See application file for complete search history.

(56) References Cited

U.S. PATENT DOCUMENTS

| 212,306 | A | * | 2/1879 | Frederick | 47/31 |
|---|---|---|---|---|---|
| 425,745 | A | * | 4/1890 | Brown | 47/47 |
| 523,068 | A | * | 7/1894 | Gaul | 211/74 |
| RE11,622 | E | * | 7/1897 | Warren | 47/47 |
| 917,655 | A | * | 4/1909 | Pittman | 47/47 |
| 933,142 | A | * | 9/1909 | Vogt | 211/62 |
| 936,402 | A | * | 10/1909 | Beasley | 47/45 |
| 1,051,390 | A | * | 1/1913 | Comstook | 47/47 |
| 1,464,801 | A | * | 8/1923 | Beers | 220/493 |
| 1,615,209 | A | * | 1/1927 | Asselin | 248/175 |
| 1,631,725 | A | * | 6/1927 | Halvorsen | 211/85.31 |
| 1,973,868 | A | * | 9/1934 | Field | 47/41.13 |
| 2,003,101 | A | * | 5/1935 | Asman | 47/41.13 |
| D97,712 | S | * | 12/1935 | Orben | D11/147 |
| 2,043,375 | A | * | 6/1936 | Hart | 47/41.01 |
| 2,209,891 | A | * | 7/1940 | Hoover | 47/32 |
| 2,266,470 | A | * | 12/1941 | Moran | 47/44 |
| 2,763,096 | A | * | 9/1956 | Roger | 47/45 |
| 2,834,153 | A | * | 5/1958 | Fearn | 47/66.2 |
| 2,982,051 | A | * | 5/1961 | Wheelock | 47/41.13 |
| 3,347,404 | A | * | 10/1967 | McIntyre | 220/486 |
| 3,630,811 | A | * | 12/1971 | Radus | 206/423 |
| 3,778,929 | A | * | 12/1973 | Pearson | 47/58.1 R |
| 4,011,954 | A | * | 3/1977 | Galli | 211/14 |
| 4,844,243 | A | * | 7/1989 | Stiles | 206/457 |
| 4,914,857 | A | * | 4/1990 | Dodgen | 47/47 |
| 4,958,461 | A | * | 9/1990 | Aldrich | 47/41.01 |
| 5,127,184 | A | * | 7/1992 | Cosentino | 47/41.01 |

(Continued)

*Primary Examiner* — Joshua J Michener
*Assistant Examiner* — Devin Barnett

(57) ABSTRACT

A confection rack enables confections to appear as a bouquet of flowers. The confection rack Comprises a plurality of wire rings in circular form mechanically coupled to one another. The plurality of wire rings is mechanically coupled to a ring base with riser prongs. The ring base is further mechanically coupled to locating prongs which can be used to align the confection rack into a pot. In this manner, a user can insert the confections into the plurality of wire rings to make the confections appear as a bouquet of flowers.

2 Claims, 2 Drawing Sheets

(56) References Cited

U.S. PATENT DOCUMENTS

| | | | | |
|---|---|---|---|---|
| 5,275,288 | A * | 1/1994 | Lockett | 206/507 |
| 5,413,801 | A * | 5/1995 | McIlwain | 426/420 |
| 6,038,812 | A * | 3/2000 | Belokin et al. | 47/41.01 |
| 6,061,953 | A * | 5/2000 | Chubb et al. | 47/31.1 |
| 6,189,261 | B1 * | 2/2001 | Helgeson | 47/41.11 |
| 6,237,882 | B1 * | 5/2001 | DiMuzio | 248/175 |
| 6,389,744 | B1 * | 5/2002 | Pugh | 47/47 |
| 6,523,301 | B2 * | 2/2003 | Delaney | 47/41.01 |
| 6,667,079 | B1 * | 12/2003 | Glenn | 428/10 |
| 6,895,712 | B2 * | 5/2005 | Gunderman et al. | 47/39 |
| 7,000,347 | B2 * | 2/2006 | Roskin | 47/41.11 |
| 7,340,859 | B2 * | 3/2008 | Palsrok | 47/39 |
| 7,387,283 | B2 * | 6/2008 | Franczyk | 248/175 |
| 7,406,798 | B2 * | 8/2008 | Barrett | 47/41.11 |
| 7,581,655 | B1 * | 9/2009 | Trangsrud | 220/4.03 |
| D601,860 | S * | 10/2009 | Madagan | D7/610 |
| D604,109 | S * | 11/2009 | Madagan | D7/610 |
| 8,006,433 | B1 * | 8/2011 | Bryanton | 47/45 |
| 8,166,703 | B2 * | 5/2012 | Driscoll | 47/41.12 |
| 8,464,463 | B1 * | 6/2013 | Fraser | 47/31 |
| 2003/0204990 | A1 * | 11/2003 | Hsueh | 47/66.6 |
| 2005/0279747 | A1 * | 12/2005 | Madagan | 220/475 |
| 2006/0070297 | A1 * | 4/2006 | Palsrok | 47/65.5 |
| 2006/0118011 | A1 * | 6/2006 | Caeton | 108/90 |
| 2006/0185231 | A1 * | 8/2006 | Barrett | 47/41.11 |
| 2006/0202094 | A1 * | 9/2006 | Traut | 248/153 |
| 2006/0213786 | A1 * | 9/2006 | Walser | 206/216 |
| 2006/0219853 | A1 * | 10/2006 | Molina et al. | 248/219.4 |
| 2006/0265951 | A1 * | 11/2006 | Foster | 47/41.11 |
| 2006/0272209 | A1 * | 12/2006 | Hart | 47/66.6 |
| 2007/0083289 | A1 * | 4/2007 | Russell | 700/245 |
| 2007/0193113 | A1 * | 8/2007 | Shelton | 47/45 |
| 2008/0016761 | A1 * | 1/2008 | Emalfarb | 47/39 |
| 2008/0202995 | A1 * | 8/2008 | Senkiw | 210/138 |
| 2008/0216882 | A1 * | 9/2008 | Gillespie | 135/96 |
| 2008/0248864 | A1 * | 10/2008 | Toyoda | 463/22 |
| 2008/0284729 | A1 * | 11/2008 | Kurtenbach et al. | 345/156 |
| 2009/0020491 | A1 * | 1/2009 | Foster | 211/181.1 |
| 2009/0061708 | A1 * | 3/2009 | Kane | 442/6 |
| 2011/0041397 | A1 * | 2/2011 | Kamahara | 47/17 |
| 2011/0131877 | A1 * | 6/2011 | Terasawa et al. | 47/66.5 |
| 2011/0232176 | A1 * | 9/2011 | Davis et al. | 47/44 |
| 2011/0277382 | A1 * | 11/2011 | Davis | 47/70 |
| 2012/0023818 | A1 * | 2/2012 | Rasmussen | 47/45 |
| 2012/0055083 | A1 * | 3/2012 | Marquez et al. | 47/45 |
| 2013/0219785 | A1 * | 8/2013 | Ritchotte | 47/45 |
| 2013/0228352 | A1 * | 9/2013 | Marks | 172/375 |
| 2013/0239477 | A1 * | 9/2013 | Smolenaars | 47/66.7 |

* cited by examiner

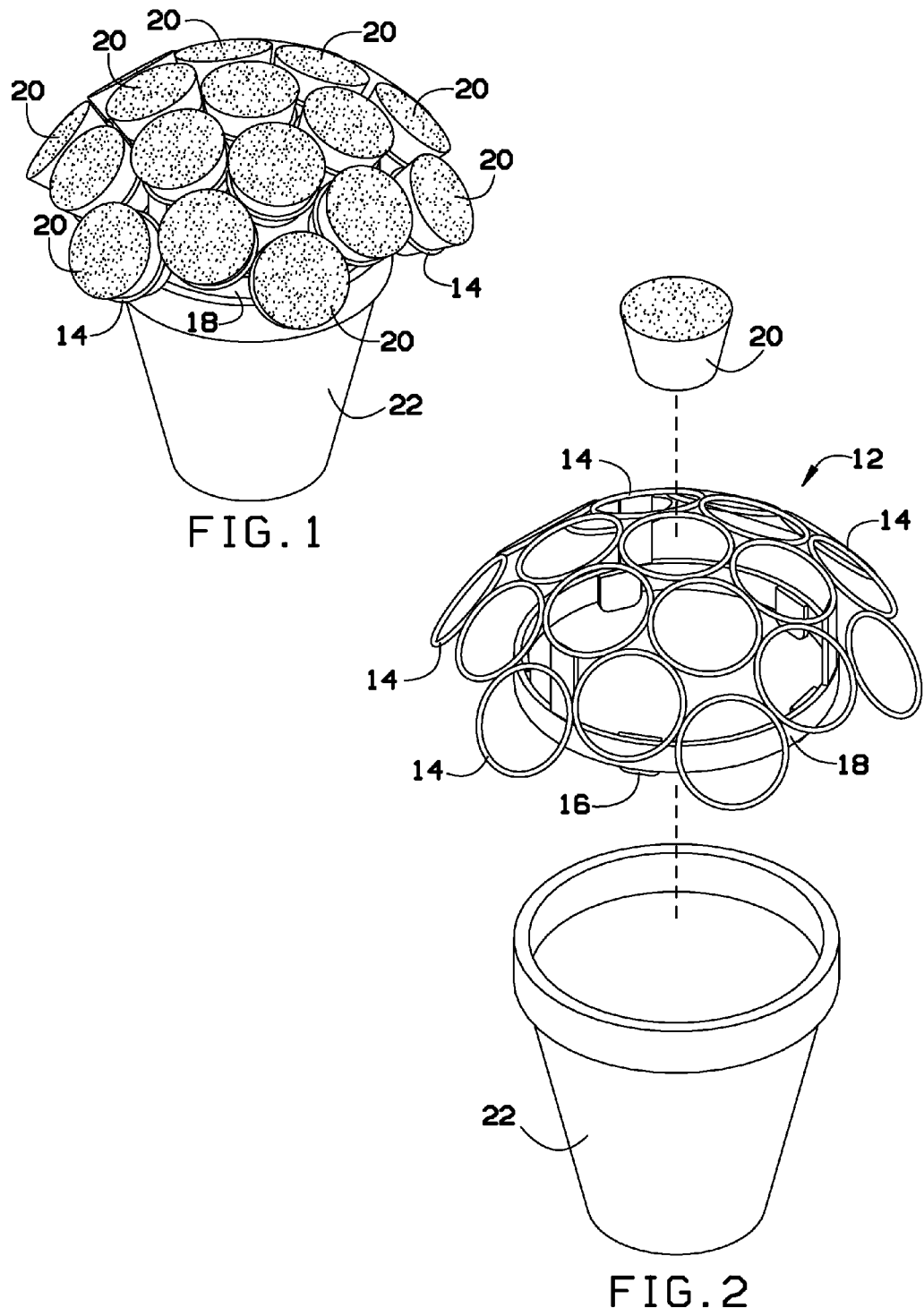

CONFECTION RACK

CROSS REFERENCE TO RELATED APPLICATIONS

This application claims priority to U.S. Provisional Patent Application 61/731,237 filed on Nov. 29, 2012.

FIELD OF THE INVENTION

The present invention relates generally to a holder for a plurality of cupcakes, muffins, and the like and, most particularly, to a decorative stand for displaying a plurality of cupcakes, muffins, and the like, creating a predetermined design which resembles a bouquet of flowers.

BACKGROUND OF THE INVENTION

The prior art includes U.S. Pat. No. 7,387,283 issued to Franczyk; U.S. Patent Application 2005/0279747 filed by Madagan; and U.S. Pat. No. 4,844,243 issued to Stiles.

Franczyk teaches a cupcake stand, but offers no theory on how to balance cupcakes in recessed cavities. Madagan teaches how to place cupcakes in recessed cavities, but does not teach the exaggerated angle necessary to make the cupcakes appear like a bouquet of flowers. Stiles solves the same problem in a slightly different way. Stiles teaches that a flexible tray can be used to take cupcakes from a band and then bend the cupcake tray in a spherical manner. Stiles also teaches that when placed on a flat serving table, the completed display presents a dome-like appearance which is pleasing to the eye. Embodiments of the present invention teach a rigid base that does not require bending, and is utilized by inserting the device into a pot, to that extent Stiles teaches away from embodiments of the present invention. Madagan points out that Stiles has a flimsy construction that easily breaks. Embodiments of the present invention likewise possess similar advantages.

BRIEF SUMMARY OF THE INVENTION

A confection rack enables confections to appear as a bouquet of flowers. The confection rack comprises a plurality of wire rings in circular form mechanically coupled to one another. The plurality of wire rings is mechanically coupled to a ring base with riser prongs. The ring base is further mechanically coupled to locating prongs which can be used to align the confection rack into a pot. In this manner, a user can insert the confections into the plurality of wire rings to make the confections appear as a bouquet of flowers.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a perspective view of an embodiment of the invention in use.

FIG. 2 is an exploded view of an embodiment of the invention.

Figure 3:
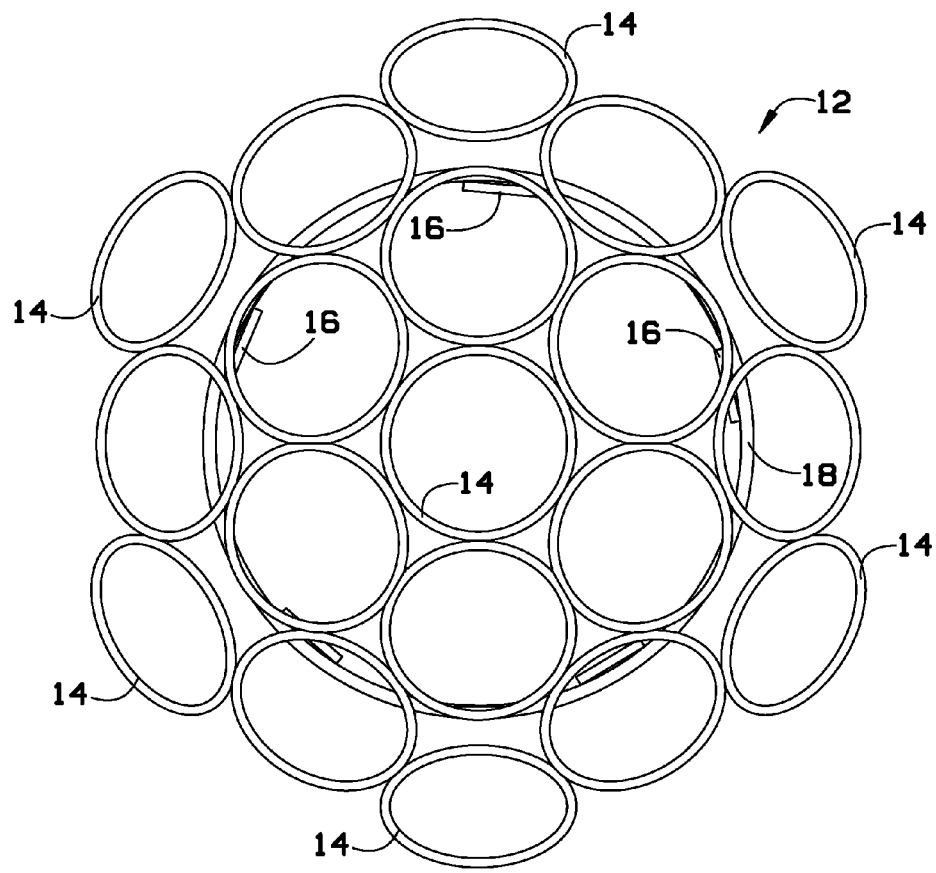

FIG. 3 is a top view of an embodiment of the invention.

Figure 4:
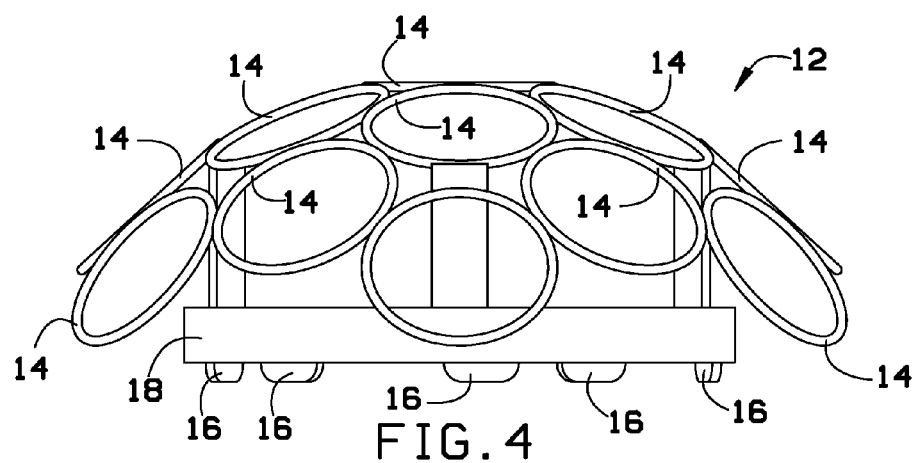

FIG. 4 is a side view of an embodiment of the invention

DETAILED DESCRIPTION OF THE INVENTION

Embodiments of the present invention overcome many of the obstacles associated with arranging confections like flowers, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 and FIG. 2 show the invention in use. Confection rack 12 comprises a plurality of wire rings in circular form 14 mechanically coupled to one another. Plurality of wire rings 14 is mechanically coupled to ring base 18 with riser prongs. Ring base 18 is further mechanically coupled to locating prongs 16 which can be used to align confection rack 12 into pot 22. To use the device, a user inserts confection rack 12 into pot 22 by resting ring base 18 inside pot 22, setting the present invention apart from the original, and then inserts confections 20 into pluralities of wire rings 14.

FIG. 3 and FIG. 4 show that confection rack 12 should be properly dimensioned in order to operate. When in use, each confection 20 should be designed, at least in part, as a truncated cone with a lower diameter at the base and an upper diameter at the frustum. The lower diameter should be less than 90% the upper diameter. Each wire ring 14 should have a diameter of about 95% the upper diameter. In this manner, confection 20 should fit comfortably in wire ring 14, without falling through wire ring 14 creating a second frustum for the truncated cone.

In some embodiments, the following arrangement of plurality of cavities wire rings 14 is effective. A central wire ring 14 is mechanically coupled to six first order wire rings 14. The six first order wire rings 14 are mechanically coupled to six second order wire rings 14. The six second order wire rings 14 are mechanically coupled to six third order wire rings 14 for a total of 19 wire rings 14. Nineteen wire rings is a preferred number to make confections 20 appear as a bouquet of flowers. Indeed, nineteen is the preferred number of wire rings, but the embodiment of the present invention should not be limited to nineteen wire rings.

The central wire ring is parallel to the ground. The six first order wire rings 14 are angled at a first angle from the central wire ring. The six second order wire rings 14 are angled at a second angle from the central wire ring. The six third order wire rings 14 are angled at a third angle from the central wire ring. When measured from a plane parallel to the central wire ring, the first angle is less than the second angle and the second angle is less than the third angle. When in use, this causes each confection 20 to be angled away from one another creating the appearance of a bouquet of flowers. One possible way to do this involves the diameter of wire ring 14 being 2⅛ inches, prong 16 being 2 inches high, and a diameter of ring base 18 being 7⅛ inches.

That which is claimed:

1. A confection rack for storing and displaying a plurality of confections and enabling the confections to appear as a bouquet of flowers, the confection rack consisting of, a plurality of circular wire rings connected to one another; each of the plurality of wire rings have a cavity for receiving one of the confections; at least two of the plurality of wire rings have a vertically extending riser prong attached to a side the respective wire rings; wherein the riser prongs are attached to a ring base; the ring base has a larger diameter than each of the plurality of wire rings; the ring base is further connected to a plurality of locating prongs;
wherein the locating prongs extend downwardly below a bottom edge of the ring base; a flower pot, wherein the locating prongs are used to align the confection rack into the flower pot; wherein the plurality of wire rings and the ring base rest upon the flower pot; the plurality of wire rings comprises a central wire ring directly connected to six first order wire rings; the six first order wire rings are directly connected to six second order wire rings; the six second order wire rings are directly connected to six third order wire rings for a total of nineteen wire rings; the central wire ring is parallel to a ground surface; the six first order wire rings are angled at a first angle from the central wire ring; the six second order wire rings are angled at a second angle from the central wire ring; the six third order wire rings are angled at a third angle from the central wire ring; the first angle is less than the second angle and the second angle is less than the third angle resulting in each confection being angled away from one another creating an appearance of a bouquet of flowers.

2. The confection rack of claim 1, wherein, when in use, each confection has a truncated cone with a lower diameter at a base and an upper diameter at a frustum; the lower diameter is less than 90% of the upper diameter; each wire ring has a diameter sized to fit a corresponding confection there within without falling through the wire ring.

\* \* \* \* \*